United States Patent [19]

Stapleton

[11] Patent Number: 5,685,469

[45] Date of Patent: Nov. 11, 1997

[54] SWING-DOWN CARRIERS WITH TOP ACTUATORS

[75] Inventor: Craig A. Stapleton, Clarkston, Mich.

[73] Assignee: Advanced Accessory Systems L.L.C., Port Huron, Mich.

[21] Appl. No.: 626,274

[22] Filed: Apr. 4, 1996

[51] Int. Cl.⁶ ........................................ B60R 9/10
[52] U.S. Cl. .................. 224/505; 224/924; 224/536
[58] Field of Search ..................... 224/495, 502–509, 224/518, 519, 520, 521, 522, 523, 524, 533, 536, 321, 331, 42.21, 42.28, 553, 924; 414/462; 211/96, 99

[56] References Cited

U.S. PATENT DOCUMENTS

| | | | |
|---|---|---|---|
| 1,792,586 | 2/1931 | Higgins | 224/508 |
| 1,795,677 | 3/1931 | Rajeska | 224/507 |
| 1,848,401 | 3/1932 | Whiteside | 224/536 |
| 3,186,612 | 6/1965 | Lyles | 224/507 |
| 3,343,736 | 9/1967 | Sellers | 224/505 |
| 3,613,971 | 10/1971 | Betz | 224/505 |
| 3,804,308 | 4/1974 | Bodde | 224/509 |
| 4,140,255 | 2/1979 | Weiler | 224/505 |
| 4,400,129 | 8/1983 | Eisenberg et al. | |
| 4,561,575 | 12/1985 | Jones | 414/462 |
| 4,767,038 | 8/1988 | McVicar | 224/505 |
| 5,094,373 | 3/1992 | Lovei | |
| 5,122,024 | 6/1992 | Stokes | 414/462 |
| 5,137,411 | 8/1992 | Eul et al. | 414/462 |
| 5,219,105 | 6/1993 | Kravitz | |
| 5,275,320 | 1/1994 | Duemmler | 224/331 |
| 5,284,282 | 2/1994 | Mottino | 414/462 |
| 5,303,857 | 4/1994 | Hewson | |
| 5,419,479 | 5/1995 | Evels et al. | 224/331 |
| 5,529,231 | 6/1996 | Burgess | 224/502 |

Primary Examiner—Henry J. Recla
Assistant Examiner—Gregory M. Vidovich
Attorney, Agent, or Firm—Rader Fishman & Grauer PLLC

[57] ABSTRACT

An improved article carrier includes an article rack, a support and a mount. A pivot joint for displacing the support with respect to the mount provides access to the rear of the vehicle without removing the carrier. Preferably the carrier bracket guides the displaceable support and includes the pivot joint that permits the support to displaced with respect to the mount. The carrier also includes a latch for releasably overlapping a portion of the bracket to retain the support in an upright, load bearing position. The latch is responsive to an actuator carried at the top of the rack. An actuator preferably comprises a handle preferably in the form of a rotary handle, positioned atop the support. A rotary knob carrying an elongated threaded rod positions the clamping jaw of the latch. In one version, the clamping jaw is pivoted into and out of overlapping relation with a flange on the bracket. Another version of the clamping jaw threadably engages a rotary rod to linearly displace the clamping jaw along the threaded portion of the rotated rod.

8 Claims, 3 Drawing Sheets

FIG 6
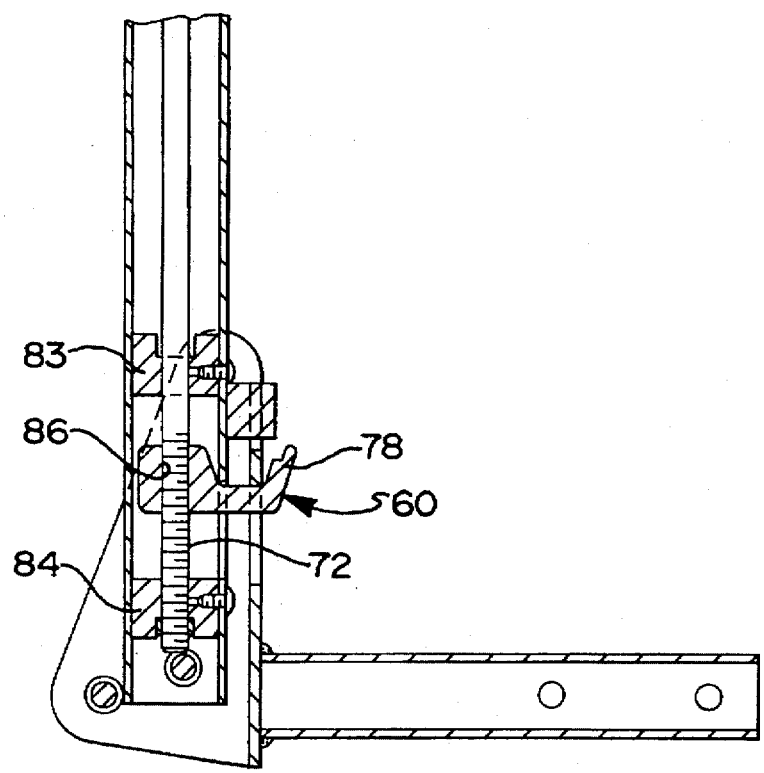
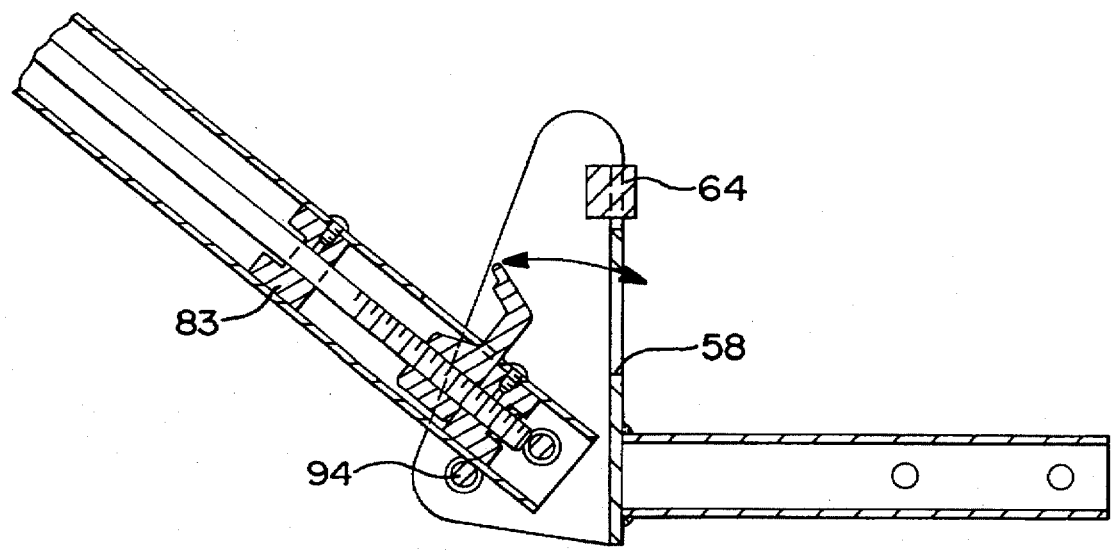
FIG 7

SWING-DOWN CARRIERS WITH TOP ACTUATORS

FIELD OF THE PRESENT INVENTION

The present invention relates generally to article carriers supported adjacent to the motor vehicle body, most typically by connection with a rear trailer hitch, and more particularly to such an article carrier in which the support can be pivoted with respect to the mount and latched in a raised position by an actuator at the top of the rack carried on the support.

BACKGROUND ART

Article carriers to be mounted at the rear of a motor vehicle provide a convenient means for carrying articles adjacent the rear of the vehicle body to provide a large unobstructed carrying space for articles such as bicycles, skis and the like. All such carriers are typically provided with a mount that cooperates with a trailer hitch for attachment to the vehicle, the support. The rack and the articles carried by the rack can obstruct access to a rear panel, such as the trunk lid, rear hatch door or tailgate, of the motor vehicle. Moreover, the carriers are often built from steel for strength and durability, and may be very heavy, even though for example tubular riser bars extend from a hitch tongue. Furthermore, the article rack may include substantial reinforcement for supporting and clamping articles such as bicycles, skis or the like in an elevated position. As a result, the carrier and its load can be extremely heavy and very burdensome to remove from the rear of the vehicle when access to the rear compartment is desired.

A previously known improvement that alleviated the need for removing load from the rack, or removing the rack from the vehicle in its loaded or unloaded condition, involves the use of a swing away mechanism in which the rack carrying the articles can be displaced away from the trunk opening for access to the trunk. One previously known rack swings horizontally away from the vehicle rear panel but the load must be carried by a cantilevered pivot pin support that is subject to wear and misalignment under load, particularly after repeated use. Other carriers have been provided with a pivot joint that displaces the support in a vertical plane, but the latching mechanisms for maintaining the support in an upright position is positioned at the pivot point and difficult to access when the rack is loaded. Other known swing-down racks require lifting of the rack or the load with the rack to reposition it from the raised position.

SUMMARY OF THE INVENTION

The invention overcomes the above mentioned disadvantages by providing an article carrier with a rack support coupled by a pivot joint to a mount for attaching the carrier to the motor vehicle, a latch for locking the support in a raised position on the vehicle operating in response to an actuator carried at the top of the support. In general, the carrier comprises a rack, a support carrying the rack and including a riser that preferably carries the rack at the top of the riser, and a support bracket including a mount for attaching the bracket to the vehicle and the pivot joint for displacing the rack with respect to the mount. Preferably, the latch includes a clamp jaw for overlapping a portion of the bracket, and a portion of the bracket is retained between a stop block and the clamp jaw.

One embodiment of the latch and actuator assembly for the article carrier includes an elongated stem extending through a long support tube forming a support riser. The threaded stem carries a correspondingly threaded clamp jaw that is linearly displaced along the stem for abutment against a stop block to entrain a bracket flange between the clamp jaw and the stop block. A rotary knob engages the top of the stem to rotate the stem for displacing the clamp member.

Another version of the preferred embodiment couples the lower end of the threaded rod by a pivot joint to the clamp member. The clamp member is also pivotally supported upon a pin carried by the support tube forming the riser. A handle, preferably in the form of a rotary knob, is carried on the threaded rod. The threaded rod is retained within a correspondingly threaded rod block secured within the support tube. Rotation of the rod displaces the end of the rod and thus pivots the clamp member about the pin carried by the support tube. Accordingly, the clamp member pivots to entrain the bracket flange between the clamp and a stop block.

As a result, the present invention provides an article carrier that is substantially easier to displace from its raised, latched position to a lowered access position by permitting the latch to be operated from atop the rack carried on the support. Accordingly, the actuator is remote from the pivot joint that is obstructed by the load carried by the rack and is positioned within reach of a user operating the carrier. In addition, the present invention avoids the need for lifting the support to disengage it from a latched upright position, and the need to support the load off center of the motor vehicle.

In addition, the present invention provides a latch actuator that improves the convenience of operating a swing-down article carrier by reducing the impediments to access and operation of the actuator. In addition, the latch mechanism provides an improved clamp for maintaining the support in an upright position, particularly when it is loaded with the articles carried by the rack. In addition, the actuator is preferably a handle, such as a rotary knob, that can be locked to restrict the operation of the actuator to persons that can release the lock.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which:

FIG. 6 is an enlarged sectional view similar to FIG. 4 but showing a modified latch according to the present invention; and FIG. 7 is an enlarged sectional view similar to FIG. 6 but showing the carrier support in a different latch actuating position.

DETAILED DESCRIPTION OF THE PREFERRED EMBODIMENT

Figure 1:
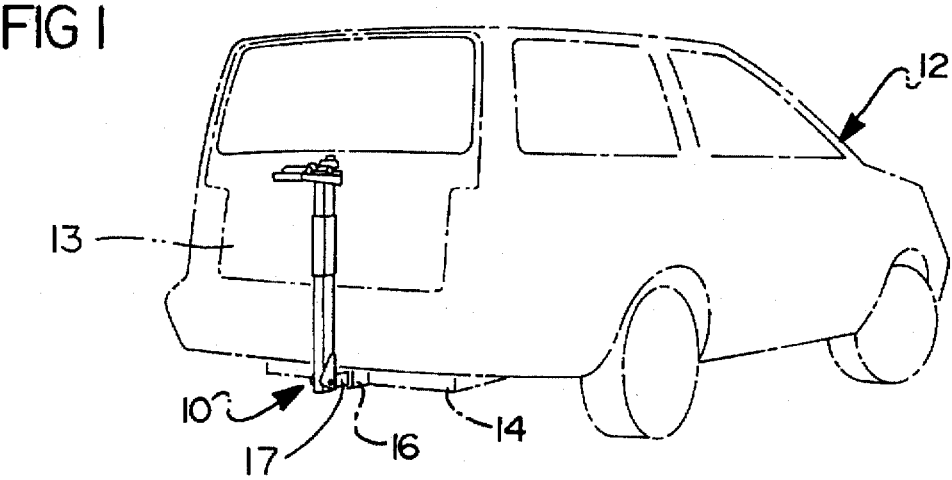
FIG. 1 is a perspective view of an article carrier mounted on a motor vehicle according to the present invention.

Referring first to FIG. 1, an article carrier 10 according to the present invention is shown secured at the rear of a motor vehicle 12 adjacent the rear entry panel, for example, the rear hatch 13 that pivots upwardly. The motor vehicle 12 carries a receiver 16 for a trailer hitch 14 including a sleeve that receives a trailer hitch tongue 17. The tongue 17 may carry a conventional trailer hitch ball or other connector. In the present invention, a tongue is formed as a part of the mount used to hold the carrier 10 in position on the motor vehicle 12. Nevertheless, the mount may be adapted for connection to other types of hitches.

Figure 2:
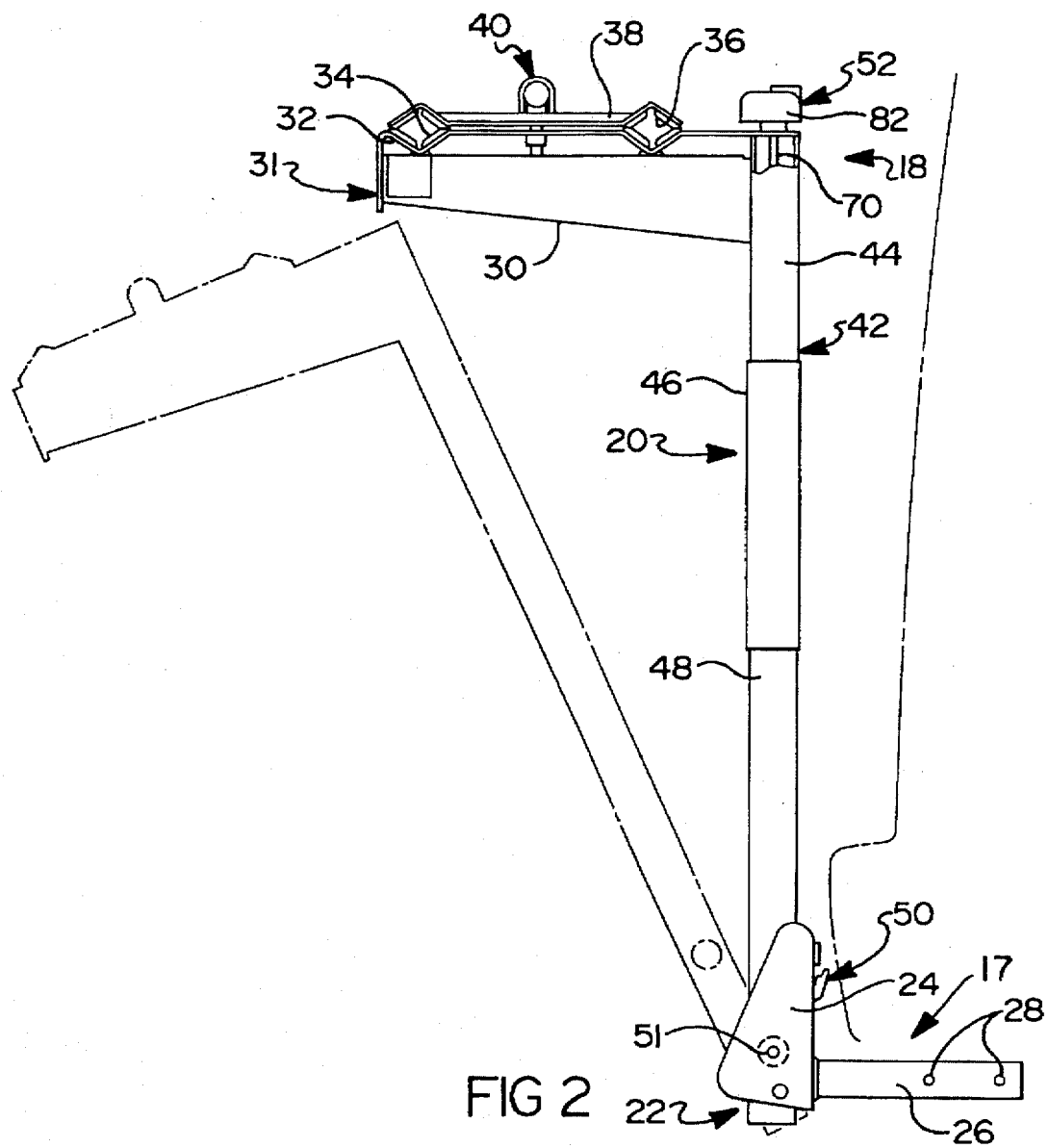
FIG. 2 is an enlarged side elevational view of the carrier shown at FIG. 1 with portions broken away for the sake of clarity.

Referring now to FIG. 2, the carrier 10 includes an article rack 18 carried by a support 20 and a mount 22 particularly adapted to hold the carrier at the rear of the vehicle 12 in cooperation with the trailer hitch 14. In the preferred embodiment, the mount 22 includes a bracket 24 supporting a tube 26 that fits within the sleeve 16. Preferably, bolt holes 28 in the tongue tube 26 align with corresponding apertures in the sleeve 16 so that the rack can be secured by bolts, pins or the like into position at the rear of the vehicle 12.

The rack 18 includes a rack housing 30 supporting a lower jaw member 32. The lower jaw member includes a pair of detents 34 that register with detents 36 of an upper rack clamp 38 that forms a bicycle holding clamp 31. Bicycle clamp 31 of rack 18 receives framing members of the bicycle between the upper and lower jaws 38 and 32. A rack clamp jaw actuator 40, preferably comprising a rotary handled stem threadably engaged in the lower jaw 32 or support housing 30, tightens the upper jaw 38 against the lower jaw as it is rotatably threaded into the lower member or a nut below the lower member. Of course, other types of clamps, such as ski racks, can be supported by the support housing 30 to form a rack 18 according to the present invention.

The rack 18 is carried by a support 20 formed in the preferred embodiment by a riser 42. Preferably, two or more tubular pieces, for example 44,46 and 48, can be telescopically joined, for example, by locking pins fitting through registering apertures or the like, to adjust the height of the riser 42, and thus the height of the rack 18, above the ground surface. The bottom of the riser 42 carries the mount 22 by bracket 24 to which it is coupled by a pivot joint 51 described below. In any event, the riser 42 and the rack 18 can be pivotally displaced from an upright, raised load carrying position shown in solid line in FIG. 2, and displaced to a lowered position at one or more positions rearward of the raised position as shown in phantom (one only shown) in FIG. 2.

The carrier 10 also includes a latch 50 and an actuator 52 positioned for access at the top of the support 20 as shown at 52 in FIG. 2. These structures cooperate by means of the bracket 24 in a manner to be described in greater detail below.

Figure 3:
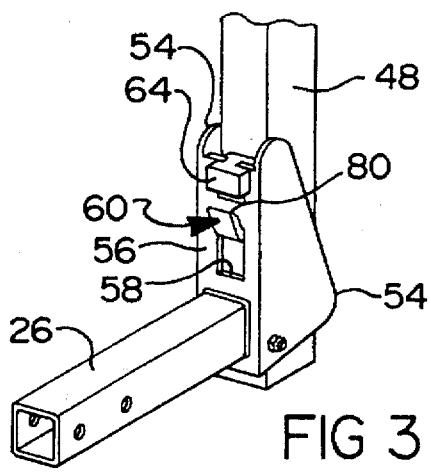
FIG. 3 is a perspective view of a portion of the carrier shown in FIG. 2.

As shown in FIG. 3, the bracket 24 includes a pair of sidewalls 54 and an end wall 56. The sidewalls 54 are parallel to and received at the sides of the rectangular tube 48. The tongue 26 is welded to the end wall 56 below an opening 58 adapted to receive a latch clamp jaw 60. A recess 62 above the opening 58 slidably receives a stop block 64, preferably made of nylon or other rigid, resilient material.

Figure 4:
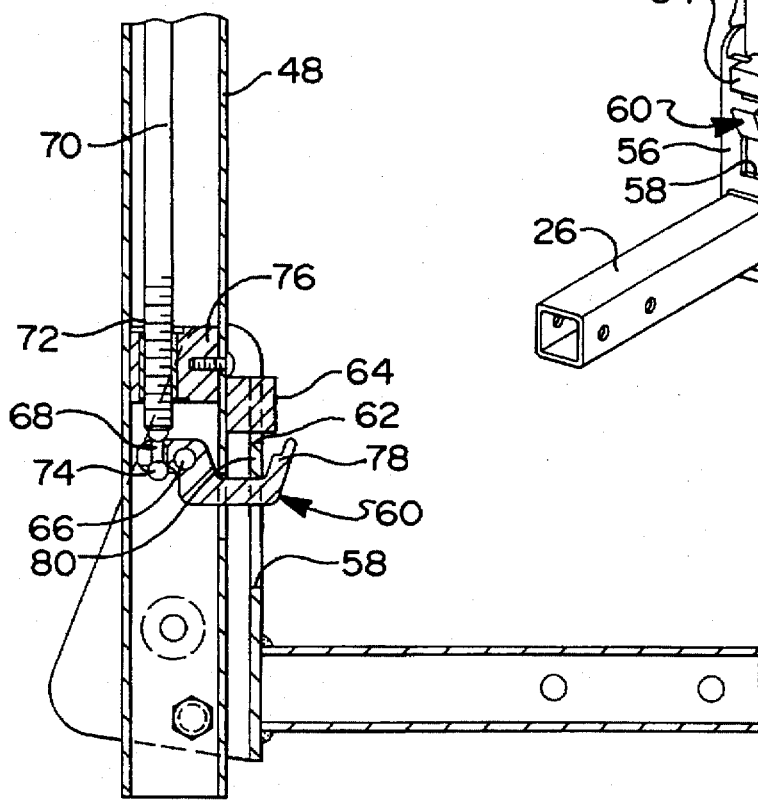
FIG. 4 is an enlarged fragmentary view of a cross section through the carrier portion shown in FIG. 3.
Figure 5:
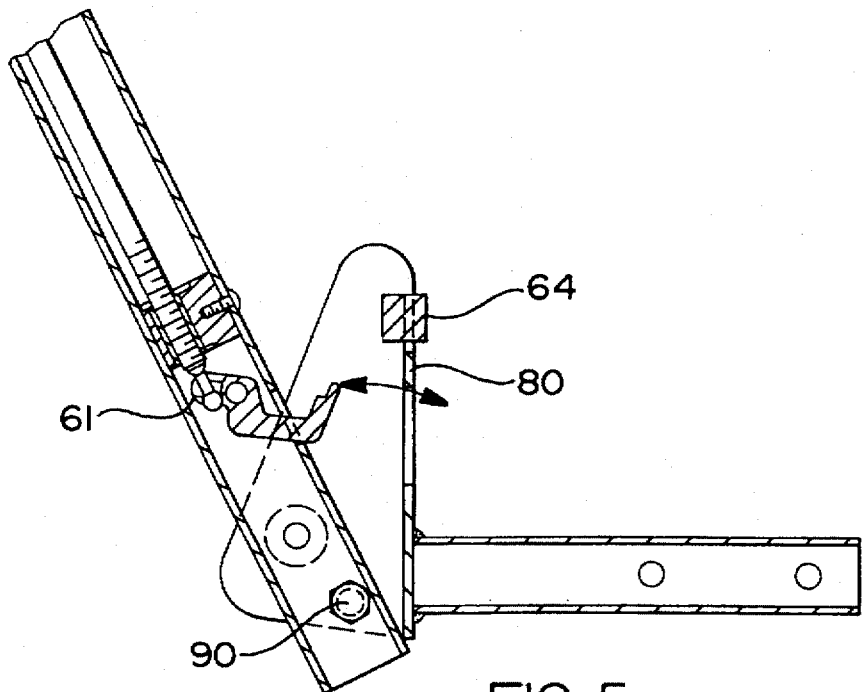
FIG. 5 is an enlarged sectional view similar to FIG. 4 but showing the latch actuated in a different latch actuating position.

As shown in FIGS. 3–5, the latch jaw 60 is pivotally secured within the tubular member 48 by a pin 66 extending across sidewalls of the tube 48. At a position spaced from the axis of the pin 66, the latch jaw 60 includes an end fork 61 having spaced walls separated by a channel that receives a narrowed portion 68 at the end of the actuator stem 70. The narrowed portion 68 between the threaded area 72 and the enlarged end 74 is entrained within the opening of the end fork 61 on the latch jaw 60. The threaded end 72 of the stem 70 is received in a threaded guide block 76, fastened by bolts or the like within the tube 48. The guide block 76 includes a correspondingly threaded bore, preferably formed by a sleeve insert that forces the enlarged end 74 linearly in the direction of the axis of the stem 70 to adjust the position of the jaw end 78 in overlapping relation to the flange 80 on the end wall 56. The insert is preferably a press fit sleeve, and preferably formed of standard bar stock, for example, hex bar stock to resist rotation in the guide block.

The stem 70 is displaced upwardly by rotation of the actuator stem 70 by a handle, preferably in the form of the knob 82. The stem 70 is displaced upwardly with respect to the guide block 76 as it rotates and pivots the clamp jaw 60 below the flange 80 in the end wall 56 of bracket 24. Accordingly, the riser 42 can then be pivoted as shown by the displaced position of the tubular member 48 in FIG. 5. Conversely, an opposite rotation of the stem 70 by knob 82 lowers the end 74 of the shaft to pivot the jaw 60 about the pivot pin 66 and raise the lip 78 to an overlapping position over the flange 80 on the end wall 56 of bracket 24. Such an embodiment provides improved latch strength because a substantial amount of the clamping force is supported by the tubular structure 48 by means of the pin 66. However, the angular displacement of the stem's narrowed portion 68 within the opening of end fork 61 of the clamping jaw 60 requires special fabrication of both the latch jaw and the threaded stem.

Referring now to FIGS. 6 and 7, a simpler actuating mechanism is shown comprising a threaded stem 70 having only a threaded portion 72 at the lower end. A guide block 83 and a spaced apart guide block 84 are fastened to the tube 48 as previously discussed for guide block 76. The guide blocks 82 and 84 position the stem 70 for rotary threaded engagement within the threaded bore 86 of the latch jaw 60. The latch jaw 60 is restrained from rotation by the jaw extending through the opening in the tubular member 48. Accordingly, rotation of the stem 70 forces the jaw 60 to be linearly displaced in the direction of the axis of the stem along the threaded end 72. Accordingly, the lip 78 is displaced into and out of overlapping engagement with the flange 80 on the end wall 56 of the bracket 24. Thus, as shown in FIG. 7, with the lip 78 displaced toward the bottom of the opening 58 in the bracket 24, the riser 42 is easily tilted toward the position shown in solid line in FIG. 7.

As a result, it will be understood that loosening of the latch clamp jaw 60 enables arcuate displacement of the riser 42 about the pivot joint 51. The pivot joint 51 includes a pin 90 that extends through registering apertures in the sidewalls 54 of the bracket 24 and sidewalls of the tubular member 48. In any event, the stop block 64 on the end wall 56 limits displacement toward the rear panels of the motor vehicle to securely support the riser 42 and the rack 10 in its raised, upright position. The release or lowered position may also be restricted for example, as shown at FIG. 5 where the edge of the front wall 56 engages the bottom of the tube 48, to restrict pivotal movement rearwardly of the upright position. Alternatively, the lowered position can be adjustable. For example, as shown in FIG. 7, a position restricting bolt 94 may be installed through registering apertures in the sidewalls 54 of bracket 24 to limit the release position of the rack to support the load above the ground surface even in the released position. The bolt 94 may also be replaced in other registering apertures arranged in a series of stop positions in the sidewall of the bracket 24.

In any event, the present invention provides an article carrier which is easily attached to an existing receiver hitch, but need not be removed in order to gain access to the rear hatch, gate or trunk of the vehicle. Moreover, access to the rear panels is easily obtained by manipulating the handle of the actuator, preferably a rotary knob, positioned at the top of the carrier above the rack. Accordingly, the actuator is easily accessed for manipulation by an operator. Moreover, while the latch carried by the bracket at the bottom of the carrier controls the upright load bearing position and the release position of the support position of the latch does not hinder latching and release by the operator.

Having thus described the present invention, many modifications will become apparent to those skilled in the art to which it pertains without departing from the scope and spirit of the present invention as defined in the appended claims.

What is claimed is:

1. An article carrier for a motor vehicle, comprising:

a rack including an article clamp for securing an article on said rack, a support carrying said rack and including a riser carrying said rack at the top of the riser, a support bracket including a mount for attaching said bracket to said motor vehicle and a pivot joint coupling said support to said bracket and for displacing said rack between raised and lowered positions with respect to said mount;

a latch for locking said support in said raised position including a clamp jaw for overlapping said bracket; and an actuator for said latch, carried at the top of said support for displacing said clamp jaw to and from said overlap position, wherein said actuator includes a handle and a threaded shaft adapted to be rotated by said handle, and wherein said clamp jaw is pivotally mounted to said support and said threaded shaft is pivotally joined to said clamp jaw.

2. The article carrier as defined in claim 1 wherein said handle comprises a knob.

3. The article carrier as defined in claim 1 wherein said clamp jaw is threadably engaged with said threaded shaft for liner displacement along the axis of the shaft.

4. The article carrier as defined in claim 1 wherein said clamp jaw is mounted by a first pivot pin retained in said support.

5. The article carrier as defined in claim 4 wherein said threaded shaft is threadably engaged in a guide block retained in said support.

6. A swing-down carrier with an article clamp, a support connected to the article clamp, and a mount including a pivot joint for arcuately dispensing the support with respect to the mount, comprises:

a bracket attached to the mount for guiding the support, a latch including a clamp jaw for releasably engaging the support in a fixed position with the bracket by overlapping a wall of the bracket, and an actuator for the latch comprising a handle positioned atop the support, said actuator also having an elongated threaded rod rotatably coupled to said jaw, and wherein said elongated threaded rod is threadably engaged in a guide block secured in said support and said rod is pivotally coupled to said clamp jaw.

7. The swing-down carrier as defined in claim 6 wherein said handle is a knob.

8. The swing-down carrier as defined in claim 7 wherein said knob engages an end of said threaded rod and rotates with said threaded rod.

* * * * *